United States Patent [19]
Brandi

[11] Patent Number: 5,128,648
[45] Date of Patent: Jul. 7, 1992

[54] LINE CUTOUT FOR ELECTRICAL DISTRIBUTION SYSTEM

[76] Inventor: Frank J. Brandi, 3121 Skillman La., Petaluma, Calif. 94952

[21] Appl. No.: 600,626

[22] Filed: Jan. 22, 1990

[51] Int. Cl.⁵ .................... H01H 71/10; H01H 71/20
[52] U.S. Cl. .................................... 337/169; 337/157; 174/45 R
[58] Field of Search ............... 337/168, 169, 180, 181, 337/157, 156, 155; 174/45 R

[56] References Cited

U.S. PATENT DOCUMENTS

| | | |
|---|---|---|
| 1,116,303 | 11/1914 | Locke . |
| 2,049,552 | 8/1936 | Walsh . |
| 2,174,476 | 9/1939 | Pittman et al. . |
| 2,821,604 | 1/1958 | Wallace .................................... 337/181 |
| 3,218,517 | 11/1965 | Sankey . |
| 3,249,719 | 5/1966 | Misare et al. . |
| 3,448,343 | 6/1969 | Kershaw, Jr. . |
| 3,810,060 | 5/1974 | Hubbard .................................... 337/157 |
| 3,868,615 | 2/1975 | Haubein et al. .................................... 337/169 |
| 4,308,566 | 12/1981 | Kazuo . |
| 4,710,847 | 12/1987 | Kortschinski et al. . |
| 4,864,455 | 9/1989 | Shimomura et al. . |

*Primary Examiner*—Harold Broome
*Attorney, Agent, or Firm*—Flehr, Hohbach, Test, Albritton & Herbert

[57] ABSTRACT

An in-line cutout comprises an elongated insulator having high tensile strength to support a length of cable between poles. Electrically conductive caps are secured to the ends of the insulator, and a fusible link is connected between the caps. One cap is electrically connected to the main line and the other cap is secured physically and electrically to the end of a branch line.

4 Claims, 3 Drawing Sheets

LINE CUTOUT FOR ELECTRICAL DISTRIBUTION SYSTEM

BACKGROUND OF THE INVENTION

This application relates to an electrical distribution system and, more particularly, to an overhead electrical distribution with one or more branch line connections. Customarily, the wires or conductors of a high voltage electrical distribution system, particularly in rural and suburban areas, extends above ground, being strung from tower to tower. In systems of moderately high voltage, say 12 kilovolts, the towers are simply upright generally cylindrical masts or poles, usually of wood, to which are attached crossarms along which are secured insulators to support the individual lines. Thus, on a crossarm carrying a three phase main line, there are three supporting conductors across it. Then, if a branch line is tapped from the main line, it must, by code, be separated vertically from the main line, normally below it, by at least a prescribed distance. For example, a three phase main line may have each of its three conductors secured to one of three insulators secured along a horizontal crossarm, near the top of the upright pole and the, conductors of the branch line are secured along a lower crossarm on the same pole. In fact, the code may require the installer to space the branch line crossarm as much as two feet below the main line crossarm. Moreover, a fused cutout is often required between the mainline and branch line acting as a switch or circuit breaker, should any electrical short occur in the branch line, as from a fallen tree, it will be isolated there and not cause damage in the main line, or even in the power generating station. In accordance with present practice, such cutouts are mounted on still another crossarm, which must also be spaced vertically from the adjacent line, whether main or branch, thus requiring another two feet or more of pole height to accommodate it.

Thus, it can be seen that under current practice, as much as the top six to eight feet of the pole may be required to accommodate the crossarms at a branch connection and, of course, a minimum clearance height is required at the bottom.

In many circumstances, the pole is also used to support other utility lines, such as telephone and cable vision (TV), and this too must be at or above the minimum height with proper separation from electrical distribution lines. Now, should it be desired to add an additional branch line to an existing three phase mainline structure with necessary cutouts, on supporting crossarms, there arises a real problem of space on the supporting pole. If it is not possible to squeeze the cross arms and cutouts into the available space, and within the limits imposed by the codes, it may be necessary to install a taller replacement pole, at a cost of several thousand dollars.

OBJECTS OF THE INVENTION

It is an object of this invention to provide a high voltage electrical distribution system wherein the number of cross arms required to install branch lines is minimized.

It is a further object of this invention to provide an in-line cutout for a branch line that eliminates the necessity for a separate cutout support crossarm.

Other objects and advantages of this invention will become apparent from the description to follow, particularly when read in conjunction with the accompanying drawing.

BRIEF SUMMARY OF THE INVENTION

In carrying out this invention, I provide an electrical cutout, which is particularly adapted for installation in a branch line junction of an overhead electrical distribution system which is secured to a generally vertical pole of wood or the like. A top crossarm is attached to the pole, and is provided with insulators along it to receive the main line conductors. In accordance with this invention, only one additional crossarm is required to accommodate both the branch line and the cutouts.

The cutout comprises basically an elongated insulator of an elastomer having relatively high tensile strength to support physically the length of the conductor suspended between poles. Electrically conductive caps are provided at the ends of the insulator and the electrical circuit is completed by a fusible link. The outboard end cap on the insulator is conditioned for attaching the unit to the branch line crossarm and to receive a connecting conductor from the main line. The inboard end cap is adapted to be connected to the branch line. Normal current flow is through the fusible link to the branch line. An electrical overload in the branch line will melt the fuse, and interrupt flow to the branch line.

DETAILED DESCRIPTION OF A PREFERRED EMBODIMENT

Figure 1:
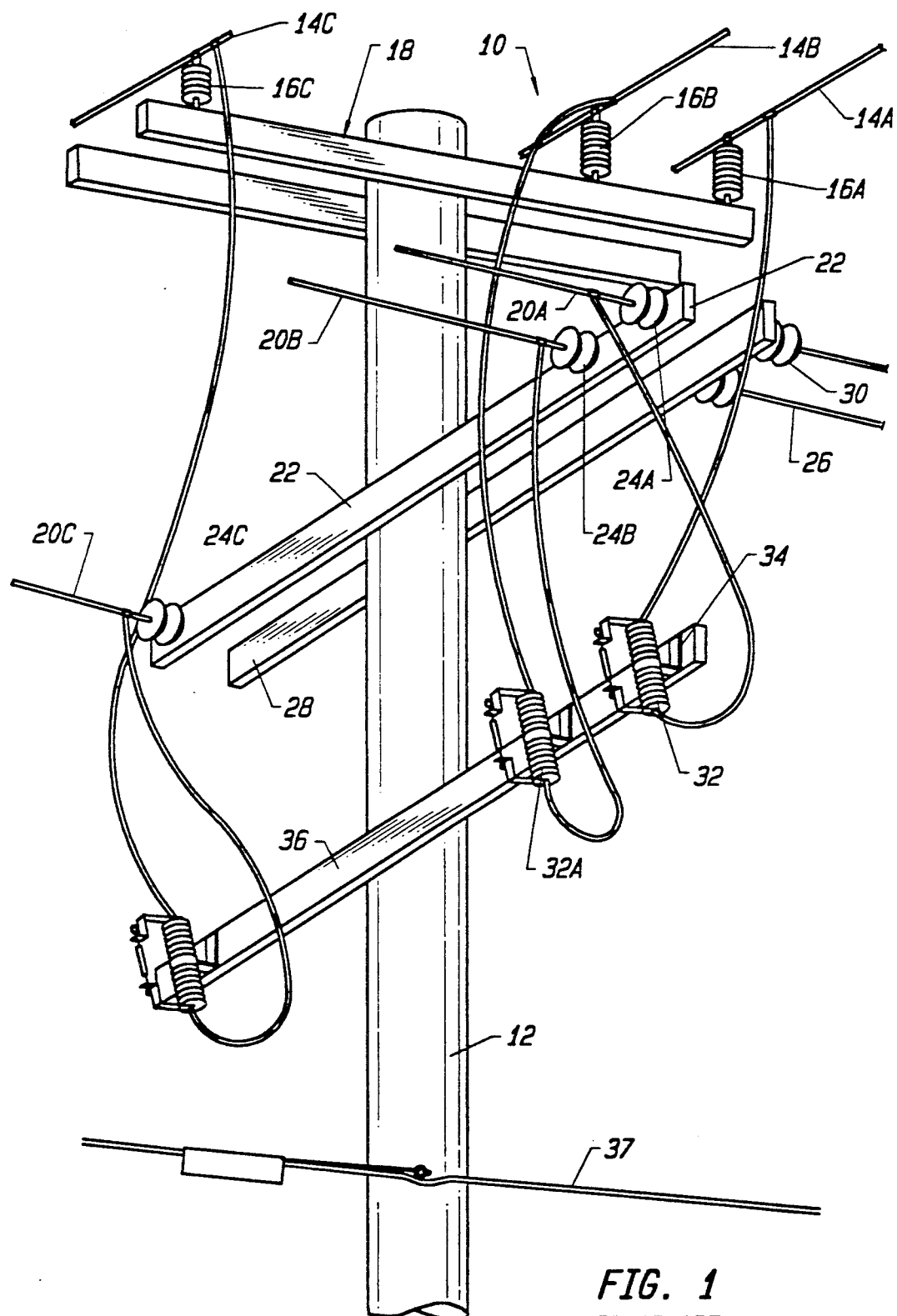
FIG. 1 is a partial view in perspective of a portion of an overhead electrical transmission system with branch line, all mounted on a vertical pole or mast in accordance with the prior art.

Referring now to FIG. 1 with greater particularity, a typical above ground, high voltage electrical power system 1 is mounted on an upright mast or pole 12 of wood or the like. Assuming a three phase installation, the mainline conductors 14a, 14b and 14c are tied, clamped or otherwise secured to insulators 16a, 16b and 16c, which are mounted across the top crossarm 18 of the pole assembly 10.

A branch line, of say 12 KV, may be tapped from the main line 14 in order to provide electricity for an adjacent shopping center, residential community or the like. In such case, the conductors 20a, 20b, and 20c are connected to a second crossarm 22, which is also attached to the pole 12 and spaced from the first crossarm 18 in accordance with the code. In a typical case, the governing code may require a spacing of two feet to minimize the danger of inadvertent contact by a lineman working on the branch line 20a, 20b, 20c.

The branch lines 20a, 20b, and 20c are connected to dead end insulators 24a, 24b and 24c, which are secured along the second crossarm 22 and spaced thereon, as by offsetting the insulators (16 and 24 to the right in FIG. 1) to provide adequate safe climbing and working space for a lineman.

If another branch line is desired at this point, appropriate conductors 26 may be connected to another second level crossarm 28 by attaching dead end insulators 30 to the other side of the pole 12.

In order to isolate a branch line 20 or 26, from the main line 14 in the event of an electrical short or damage in the branch line, the conductors 20a, 20b, and 20c must be connected from the main line 14a, 14b, and 14c through fused cutouts 32.

In accordance with present practice, the cutouts 32 are mounted on suitable brackets 34 that are bolted or otherwise secured to a third level crossarm 36, which is attached to the pole and spaced below the next adjacent crossarm 22 in accordance with the code, say two feet. As shown, the cutouts are connected between the main line 14 and the branch line 20 to isolate the branch line 20 in the event of overload.

Since the cutouts 32 are generally disposed nearly upright on the crossarm 36 portions thereof may extend above the crossarm, and the prescribed spacing must be measured from the topmost connection 32a of the cutout. Hence, in a simple branch line connection involving one or two branch lines at a single level, several feet of pole space are required to accommodate the necessary crossarms. In addition, the pole may support other lines, such as a telephone line 37 and, under the code, an additional amount of clearance space is required between it and the next higher electric conductor. Accordingly, a problem may arise in squeezing in accommodations for additional branch lines should same be required.

Figure 2:
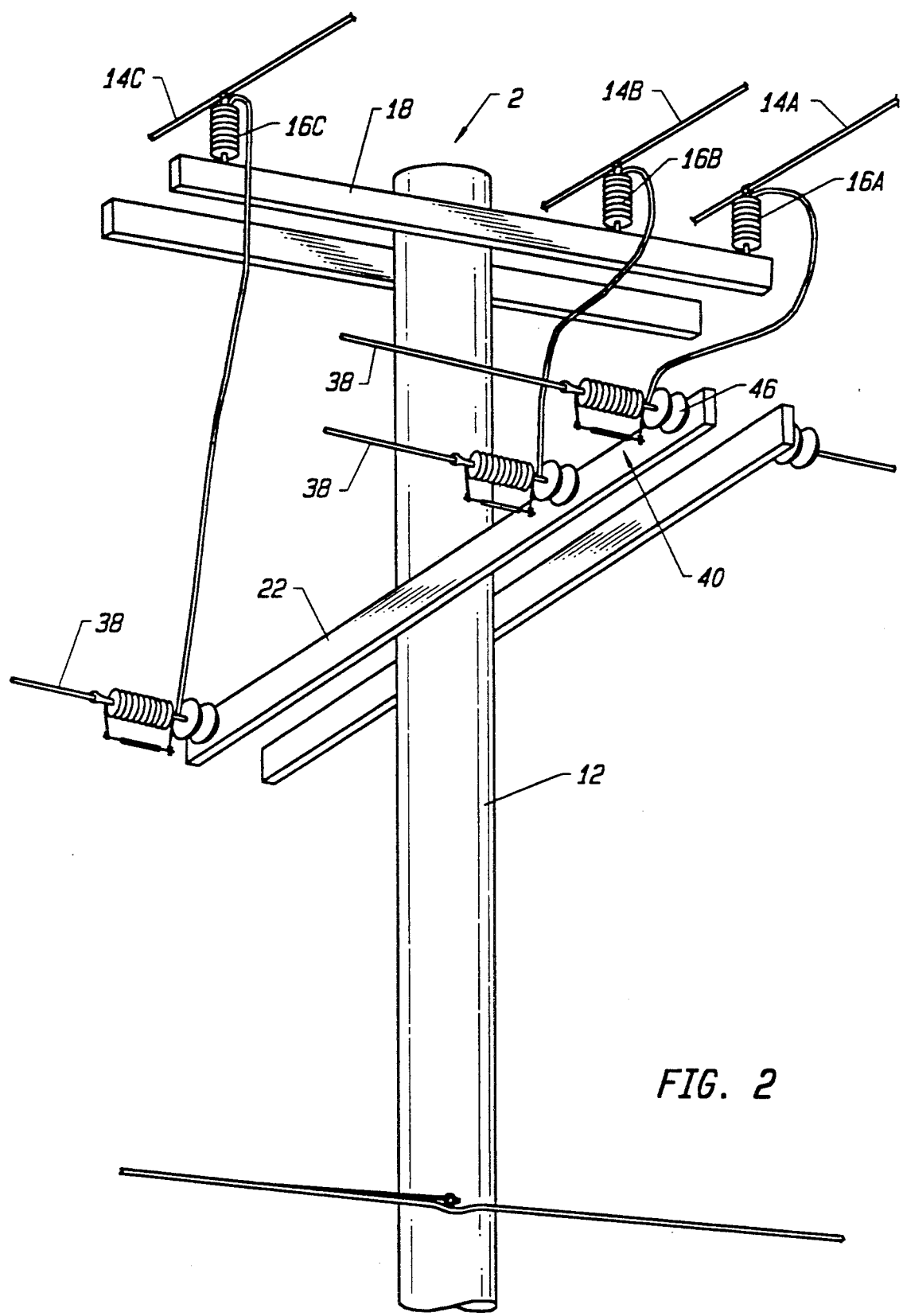
FIG. 2 is a partial view in perspective of a portion of the same system incorporating the in line cutout of this invention.
Figure 3:
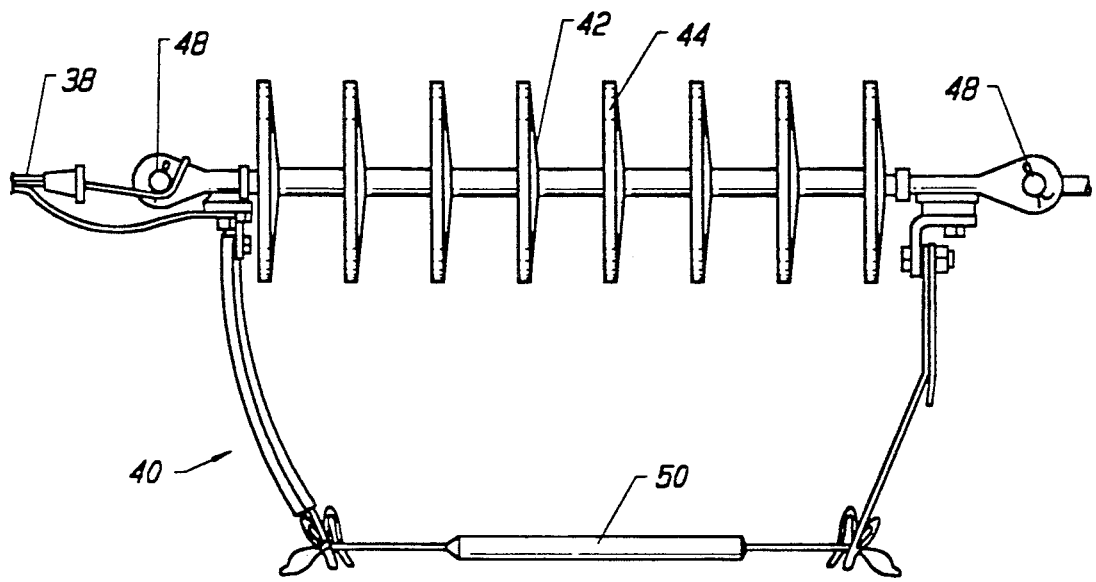
FIG. 3 is a side view of the cutout of this invention.
Figure 4:
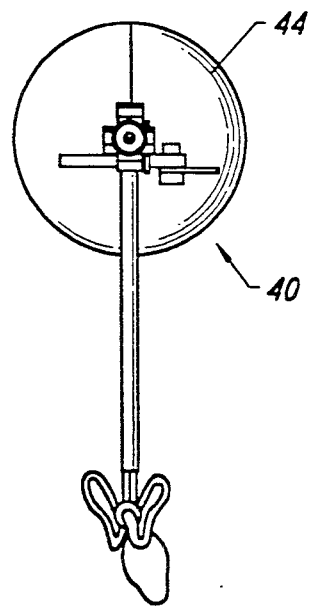
FIG. 4 is an end view of the cutout.

Referring now to FIGS. 2 to 4 with greater particularity, the in-line cutout of this invention is described in greater detail.

In this embodiment 2, the main line conductors 14 are supported on insulators 16, which are carried along a crossarm 18, which is secured to the pole 12, as in FIG. 1.

In this embodiment, however, the branch line conductors 38 are secured to the second level crossarm 22 by the in-line cutout 40 itself. As shown more particularly in FIG. 3 and 4, the in-line cutout 40 comprises an electrically insulated body 42 of an elastomer or plastic, such as a polytetrafluoroethylene (PTFE) having substantial tensile strength so that it can easily carry that length of cable 38 extending from one pole to the next.

The insulator has a plurality of generally circular fins 44 extending from the rod-like body 42 and the core body 42 has eyes 48 at opposite ends to secure to a dead end insulator 46 (FIG. 2) and to the branch line conductor 38. A fused link 50 is wired around the dead end insulator 42 so that, in the event of an overload, the branch line will be interrupted and isolated from the main line 14.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as the invention is:

1. A current protection apparatus comprising:
   a vertically standing pole;
   a horizontal crossarm coupled to said vertically standing pole;
   an elongated body formed from an insulating material with high tensile strength, said body including a first end and a second end, said first end including means for attaching said elongated body to said horizontal crossarm so that said elongated body is horizontally oriented with respect to said pole; and
   a fusible link coupled to said first end of said elongated body and said second end of said elongated body, whereby current from a mainline received at said first end is conveyed through said fusible link to a branch line coupled to said second end, said fusible link forming an open circuit when excess current flows therethrough.

2. A device of claim 1 wherein said body is formed from polytetrafluoroethylene.

3. A current protection apparatus comprising:
   a vertically oriented pole;
   a horizontally oriented mainline support member coupled to said vertically oriented pole and supporting a high voltage mainline;
   a horizontally oriented branch line support member coupled to said vertically oriented pole an supporting a branch line;
   an elongated body with a first end and a second end, said body formed from an insulating material and including a plurality of circular fins;
   an outboard end cap positioned at said first end of said body, said outboard end cap including an eye for directly coupling said elongated body to said branch line support member at said first end of said body so that said elongated body is horizontally oriented in respect to said vertically oriented pole, said outboard end cap further including means for receiving a connecting conductor from said mainline;
   an inboard end cap positioned at said second end of said body, said inboard end cap including an eye for coupling said elongated body to said branch line; and
   a fusible link coupled between said inboard end cap and said outboard end cap whereby current from said mainline received at said inboard end cap is conveyed through said fusible link to said branch line coupled to outboard end cap, said fusible link forming an open circuit when excess current flows therethrough.

4. The device of claim 3 wherein said body is formed from polytetraflurorethylene.

* * * * *